United States Patent [19]

Zarnstorff et al.

[11] Patent Number: 4,697,280
[45] Date of Patent: Sep. 29, 1987

[54] METHOD AND APPARATUS FOR THE MEASUREMENT OF X-RAY SOURCES

[75] Inventors: William C. Zarnstorff; Frank N. Ranallo, both of Madison, Wis.

[73] Assignee: Wisconsin Alumni Research Foundation, Madison, Wis.

[21] Appl. No.: 648,020

[22] Filed: Sep. 6, 1984

[51] Int. Cl.[4] ............................................. G01D 18/00
[52] U.S. Cl. ..................................... 378/207; 378/19; 250/252.1
[58] Field of Search ................ 378/207, 19; 250/252.1

[56] References Cited

U.S. PATENT DOCUMENTS

| | | |
|---|---|---|
| 3,515,873 | 6/1970 | Higgins et al. |
| 3,766,383 | 10/1973 | Harris et al. |
| 3,973,128 | 8/1976 | LeMay ................................... 378/19 |
| 4,097,736 | 6/1978 | Jacobson et al. |
| 4,136,281 | 1/1979 | Murray |
| 4,189,645 | 2/1980 | Chaney et al. |
| 4,203,033 | 5/1980 | Jacobson |
| 4,225,316 | 9/1980 | Lewin ............................ 250/252.1 |
| 4,292,538 | 9/1981 | Carlson ................... 378/19 |
| 4,355,230 | 10/1982 | Wilson et al. |
| 4,361,900 | 11/1982 | Siedband |
| 4,400,821 | 8/1983 | Aichinger et al. |
| 4,442,496 | 4/1984 | Simon et al. |

OTHER PUBLICATIONS

"An Instrument with Digital Readout for Indirect Determination of kVp," Edward L. Chaney, et al, Med. Phys. 5(2), Mar./Apr. 1978, pp. 141-145.
Advertisement for "Digi-X", X-ray Detector produced by ScanFlex Medical AB.
Advertisement for Model 35070 Digital kVp Meter produced by Keithley Instruments, Inc.
Advertisement for Model KV 1 KV Measuring Instrument by Photon Physics.

Primary Examiner—Craig E. Church
Assistant Examiner—David P. Porta
Attorney, Agent, or Firm—Isaksen, Lathrop, Esch, Hart, & Clark

[57] ABSTRACT

An X-ray measurement device (20) is disclosed which utilizes a pair of detector units (29, 30) which receive X-rays through filters (40, 41) of differing attenuation of X-rays. The detector units preferably include two pairs of photodiode detectors arranged symmetrically in four quadrants with the diodes in each detector unit in diagonally opposite quadrants, thereby minimizing the effects of changes in orientation of the device with respect to the axis of the X-ray beam. The outputs of the detector units are passed to variable gain amplifiers (42, 43) the gains of which are automatically adjusted to bring the output voltages within a desired range, and the outputs of the amplifiers are integrated by integrators (49, 50). After a selected period of time, the integration is stopped and the output voltages of the integrators (49, 50) are held and passed to an analog-to-digital converter (57) which determines the ratio of the output signals from the integrators and provides a multi-bit output signal on a bus (58) to the address lines (59) of a preprogrammed memory (60). The data location addressed by the output signal from the converter may contain data which corresponds to the kVp value of an X-ray machine at the calculated ratio, and the output data from the memory is provided to a display unit (63) to provide a visual display in decimal form of the measured kVp value.

26 Claims, 10 Drawing Figures

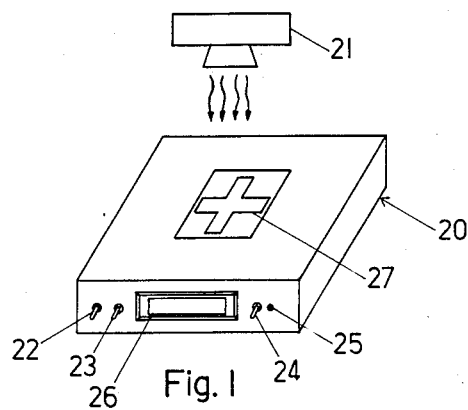
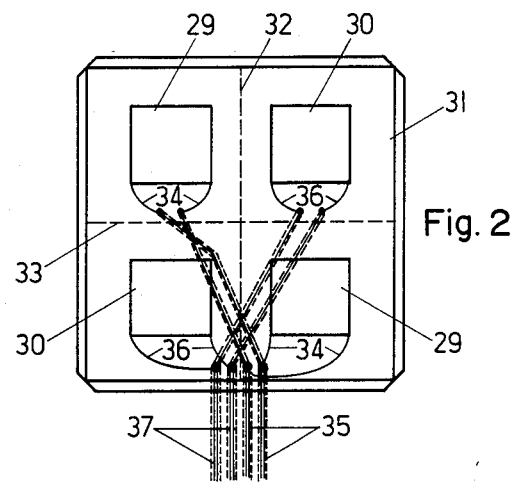
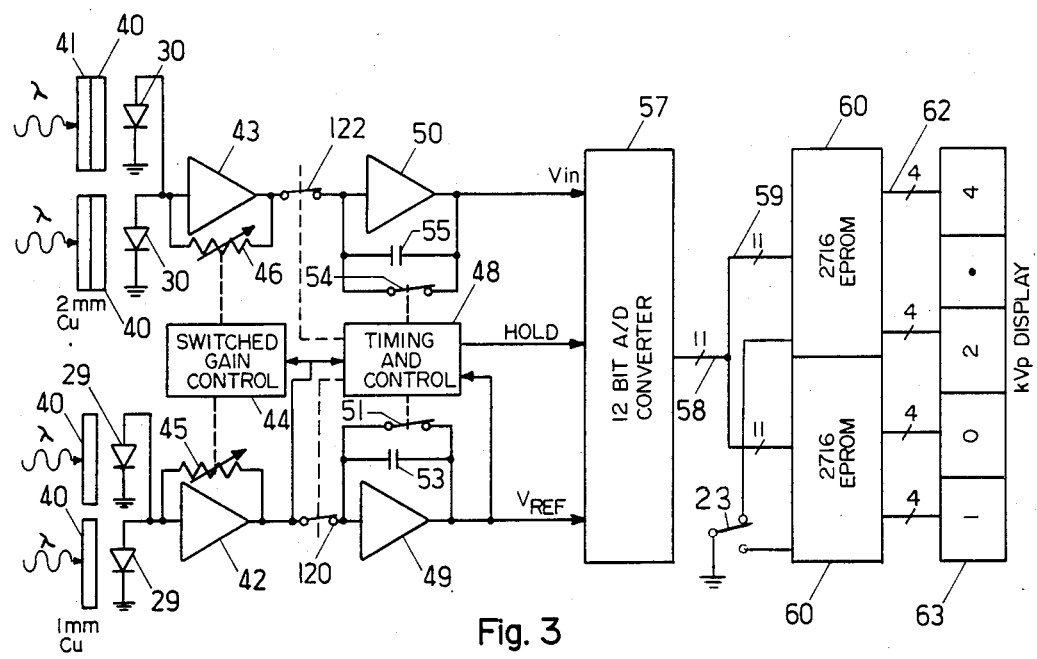
Fig. 1
Fig. 2
Fig. 3

METHOD AND APPARATUS FOR THE MEASUREMENT OF X-RAY SOURCES

FIELD OF THE INVENTION

This invention pertains generally to the field of devices which measure radiation and particularly to such devices used to measure the output radiation of X-ray machines.

BACKGROUND ART

In general, the energy level of the emitted X-rays from an X-ray machine varies directly with the high voltage electrical potential across the X-ray tube. The usual practice is to rate the X-ray machine output in terms of the maximum applied potential, or kilovolt peak (kVp), which corresponds to the highest energy X-ray photons emitted from the source, since the highest energy X-ray photons determine the effective penetrating power of the X-ray beam.

Because of occasional calibration errors and changes in operating characteristics over time, the actual kVp applied to the X-ray tube may not be equal to the kVp setting indicated on the control panel of the X-ray machine. It is thus normal practice to periodically check the accuracy of the kVp setting on X-ray machines and recalibrate if necessary. This may be done directly by measuring the voltage applied across the X-ray tube, but because of the practical difficulties and hazards of measuring the high voltage applied to the tube it is often preferable to use an indirect method of measurement which deduces the kVp level by taking measurements of the radiated X-ray beam.

One type of device presently available for determining the kVp level from X-ray source beam measurements utilizes a pair of X-ray sensitive detectors which are located behind X-ray absorber filters of different thicknesses or materials. The kVp level of the X-ray tube can be determined from the ratio of the output signals from the two sensors, which signals are related to the radiation intensities incident upon the sensors. The sensors, typically semiconductor photodiodes, are generally placed closely adjacent to one another to sample essentially the same portion of the X-ray beam. However, if the X-ray intensity distribution in the beam varies from the position of one sensor to the other, erroneous readings will be obtained by the devices. Moreover, the readings obtained depend on the proper orientation of the sensors with respect to the beam, and consistent readings will not be obtained if the device is not precisely and consistently aligned with the midline of the beam. For example, if the two adjacent sensors are lined up in one orientation facing the X-ray tube for one test exposure and are then lined up in an orientation rotated 90° in the plane facing the X-ray tube for the next exposure, the kVp readings obtained from the device for the two exposures will often not be the same.

Existing instruments of this type also tend to be sensitive to the absolute intensity level of the X-ray beam and may require adjustment by the operator prior to the taking of an exposure to accommodate the device to an expected X-ray intensity range. However, if the actual output from the X-ray machine is above or below the anticipated range, the readings from the device will be in error and further exposures must be taken.

SUMMARY OF THE INVENTION

The X-ray measurement apparatus in accordance with the present invention utilizes a pair of detector units each responsive to the intensity of X-rays incident upon it to produce an output signal related to the incident X-ray intensity. The X-rays reaching the detectors are passed through filters of differing attenuation characteristics; for example, the thickness of the filter over one of the detectors may be greater than the thickness of the filter over the other. The detector units are preferably arranged in a plane with the centers of the areas of each unit which are responsive to the radiation being coincident so that variations in the outputs of the detectors with changes in the orientation of the device are minimized. A preferred detector arrangment consists of two pairs of square-surfaced photodiodes arranged in the four quadrants of a square with each pair of detectors, constituting a single detector unit, disposed in diagonally opposite quadrants.

The output signals of the detector units—for example, the diode currents from photodiode detectors—are preferably passed to adjustable gain current-to-voltage amplifiers. Means are provided to adjust automatically and simultaneously the gain of each of the amplifiers so that the output signals from the amplifiers will be in a desired voltage range. The switching and adjustment of the gain of the amplifiers is preferably accomplished during an initial delay period after initiation of an X-ray exposure, e.g., during the first 30 milliseconds, and before any measurements of the outputs of the amplifiers are made. After the selected delay period, which allows for stabilization of the X-ray output signal and selection of the proper gain from the amplifiers, the output of each amplifier is provided to an integrator which is allowed to integrate the signal from the amplifiers until a selected voltage level at one of the integrators is reached or a selected delay time after the X-ray exposure has terminated has elapsed. At such point, integration of the amplifier output signals is halted and the output of each integrator is held at its then existing level and supplied to an analog-to-digital converter which preferably provides a parallel line, multi-bit digital output signal which corresponds to the ratio between the integrator outputs. This ratio is a function of the penetrating ability of the X-ray photons passing through the filters and thus is related to the kVp applied to the X-ray tube and the conditions of X-ray beam filtration.

The multi-bit digital output from the converter may be supplied directly to a display and utilized by the operator to calculate kVp level applied to the X-ray machine or other characteristics of the X-ray beam generated by the X-ray machine. However, to provide a direct readout to the operator of kVp level, the output lines of the converter may be connected to the address lines of a preprogrammed read only (ROM) memory in which the data stored at each address location corresponds to a kVp level predetermined to correspond to the ratio data provided from the converter. The data bus of the memory may then be provided directly to a display unit which provides a visual display to the operator of the kVp value in kilovolts.

To obtain an X-ray kVp measurement, an operator simply places the measurement device into the beam path from an X-ray machine and takes an X-ray exposure at a chosen kVp setting on the X-ray machine. The present apparatus senses the initiation of an exposure and automatically determines the proper gain setting, makes a measurement of the kVp level, and displays the measured level to the operator, retaining such display until the next X-ray exposure is taken. In the preferred arrangement of the detector units, the apparatus is relatively insensitive to variations in rotational position of the detector with respect to the cathode-anode axis of the X-ray tube, displacements from the central axis of the X-ray beam, and small angles of tilt with respect to the plane perpendicular to the beam, so that consistent measurements of kVp level are more readily obtained from one exposure to another. The apparatus also is capable of providing more accurate output data based on the ratio between the detector output signals than is generally obtained with present devices since such devices presume a substantially linear relationship between a power of the logarithm of such ratio and the kVp level. However, since the actual relationship as experimentally measured can be somewhat nonlinear, the correspondence between ratio and the data indicative of kVp level to be stored in the ROM memory may be determined empirically to allow more accurate output readings to be obtained over the entire range of kVp levels which the device is capable of measuring. In addition, the apparatus may be readily adapted to provide a direct reading of kVp level for both single-phase and three-phase X-ray machines by simply providing a different data set within the ROM memory, with the appropriate data in memory being accessed for the type of X-ray machine tested. The apparatus can be used with both radiographic and fluoroscopic systems by allowing a longer initial delay time before measurement of the detector intensity ratios in the fluoroscopic mode to allow sufficient time for stabilization of the X-ray beam.

The device may also be adapted to provide half value layer measurements by eliminating the filter over one of the detectors, and is capable of being operated in a self check mode in which the filters over each diode provide identical X-ray attenuation. In the latter mode, the output reading from the device should be essentially identical for every exposure. A change in readings indicates a change in device characteristics.

Further objects, features and advantages of the invention will be apparent from the following detailed description when taken in conjunction with the accompanying drawings.

BRIEF DESCRIPTION OF THE DRAWINGS

In the drawings:

FIG. 1 is a simplified external perspective view of the X-ray measurement device of the invention in position to intercept a portion of a beam of X-rays from an X-ray machine.

FIG. 2 is a top plan view of a preferred arrangement of photodiode detector units.

FIG. 3 is a simplied block diagram of the detection and signal processing components of the apparatus of the invention.

BEST MODE FOR CARRYING OUT THE INVENTION

Figure 4:
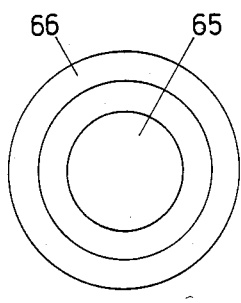
FIGS. 4–8 are plan views of other detector unit arrangements which can be utilized in accordance with the invention.

For purposes of illustration, an external perspective view of a device embodying the apparatus of the present invention is shown generally at 20 in FIG. 1 in position to intercept a portion of a beam of X-rays from an X-ray source 21. The measuring device 20 is designed to be self-contained, having no external wires or power lines, and is illustratively shown as having an on-off switch 22, single-phase or three-phase select switch 23, radiographic or fluoroscopic mode switch 24, an indicator light 25 to indicate to the operator when an X-ray measurement is being made, and a digital display panel 26 for displaying the kVp reading as measured by the device. A target pattern 27 is formed on the face of the device to aid the operator in properly positioning it in the center of the beam of X-rays. After the device is positioned by the operator, the switch 23 is set to either single-phase or three-phase depending on the type of X-ray machine being tested, and the switch 24 is set to the radiographic or fluoroscopic mode position depending on the type of X-ray exposure that is to be made. The position of this last switch determines the length of time delay between the beginning of an X-ray exposure and the start of the kVp measurement. For example, delays of 30 milliseconds in the radiographic mode and 1.2 seconds in the fluoroscopic mode between initiation of exposure and start of the measurement have been found satisfactory. The kVp level measured can be displayed in standard decimal format on the display 26 and will remain for viewing by the operator until another X-ray exposure is made, whereupon the new reading will replace the old, or until the device is turned off.

The apparatus of the invention measures the X-ray beam intensity passed through two filters which have different attenuation characteristics, as by being formed of different thicknesses of the same material (e.g., copper) or of different materials that provide differing attenuation of X-rays. The ratio of the detected X-ray intensity emerging from the two filters is a function of the X-ray absorption coefficient of the filter material (which is itself a function of the energy of the X-ray photons) and the difference in thicknesses of the filters. This measured ratio thus can be functionally related to the kVp level of the X-ray machine, allowing the device to calculate kVp from the ratio and display the calculated kVp to the operator.

A top plan view showing the preferred arrangement of the X-ray intensity detectors is shown in FIG. 2, in which pairs of photodiodes 29 and 30 are arranged evenly about a square support plate 31 which, for illustration, has been divided into four quadrants as defined by the illustrative medial lines 32 and 33. The detectors 29 together form a detector unit and have their output wires 34 connected together in parallel to shielded output lines 35. Similarly, the photodiodes 30 form a detector unit and have their output leads 36 connected in parallel to shielded output lines 37. As will be apparent from the discussion below, the apparatus of the invention may also utilize detector units (e.g., a photodiode) or several individual detectors. For the configuration shown, it is preferred that the detectors 29 and 30 be matched in size and characteristics (e.g., 1 cm$^2$ active area PIN photodiodes obtained from United Detector Technology). The two detectors 29 are arranged such that the center of area of the active surfaces of the detectors which respond to X-ray radiation lies at the intersection of the medial lines 32 and 33. The term "center of area" as used herein means the point of a plane figure that would coincide with the center of mass of a thin uniform distribution of material over the area of the figure. Similarly, the center of area of the active surfaces of the pair of photodiodes 30 lies at the intersection of the medial lines 32 and 33, coinciding with the center of area of the photodiodes 29. Because the centers of area of the active surfaces of the detector units coincide, the output of each detector unit (pairs of photodetectors 29 or 30) on the lines 35 and 37 will be substantially independent of the orientation of the detectors with respect to the cathode-anode axis of the X-ray tube. It is seen that the outputs on the lines 35 and 37 will be the sums of the outputs of the detectors 29 and 30, respectively (with photodiodes as detectors), which effectively averages the X-ray intensity seen by the two diodes in each pair. The "averaged" X-ray intensity received by the pairs of detectors thus will not change substantially with rotational orientation. The four detectors arranged as shown in FIG. 2, with each pair of detectors diagonally opposed to each other in a substantially symmetrical configuration, is preferred since it utilizes a minimum number of simple, standard square-surfaced photodiodes of the same size.

In accordance with usual fabrication procedures for instruments of this type, the photodiodes 29 and 30 may be mounted on the insulating base 31 and covered with a sheet of insulator (e.g., polyester) and the filtering material laid in proper position on the polyester. For example, the filters may comprise a 1 millimeter sheet of copper covering the entire area of the insulating base 31 with an additional millimeter of copper placed over the photodiodes 30. The detectors and copper filters may then be placed in a shallow lead box and encapsulated in light blocking epoxy to avoid excitation of the photodiodes by ambient light.

With reference to the block diagram of FIG. 3, incident X-ray radiation is illustrated as passing through a single layer 40 of copper filter before impinging on the detectors 29, and through a filter twice as thick, composed of the copper layer 40 and a second copper layer 41, before reaching the detectors 30. The outputs of the detectors 29 are provided to a current-to-voltage amplifier 42 and the outputs of the detectors 30 are provided to a current-to-voltage amplifier 43. A gain controller 44 monitors the voltage at the output of the first amplifier 42 during an initial period of time after an X-ray exposure begins and simultaneously adjusts the feedback resistance about the amplifier 42 (illustrated at 45) and the feedback resistance 46 about the amplifier 43. The effective gain provided by the amplifiers 42 and 43 is thereby adjusted so that the output of the amplifiers will be at a voltage level within a desired range of voltages independent of the magnitude of the current from the photodiodes 29 and 30.

After a preselected period of time, determined by a timing and control means 48, the outputs of the amplifiers 42 and 43 are provided to integrating amplifiers 49 and 50, respectively, by closing switches 120 and 122. The controller 48 also controls a switch 51 connected across the feedback capacitor 53 for the integrating amplifier 49 and a switch 54 connected across the feedback capacitor 55 for the integrating amplifier 50. The outputs of the integrators 49 and 50 are supplied to the reference voltage and input voltage inputs of a dual slope analog-to-digital converter 57. The controller 48 monitors the output of the integrator 49 and provides a hold signal to the converter 57 to hold it in its previous output condition until the output of the integrator 49 reaches a selected voltage level or for a selected period of time, whereupon the integrators 49 and 50 are isolated from the amplifiers 42 and 43 by opening the switches 120 and 122, to maintain the output voltages from the integrators constant thereafter, and a "run" signal is provided from the controller 48 to the converter 57. The integrators serve to minimize higher frequency noise from the detectors and present steady voltage levels to the converter which are averages of the actual X-ray intensities received by the detectors. The converter determines the ratio of the voltages from the integrators 49 and 50 and provides a multi-bit digital output signal indicative thereof on a parallel (e.g., 11 bit) output bus lines 58 which are connected to the address bus lines 59 of preprogrammed read only memory (ROM) unit 60. Each memory location in the ROM memory unit 60 addressed by an output signal from the converter 57 has data stored therein which corresponds to the kVp level at the particular ratio determined from the converter 57. The data from the ROM 60 is provided on its data bus line 62 to a display unit 63, which includes, for example, a display driver and a liquid crystal display with a decimal readout (e.g., PCIM 181-2), thereby allowing the operator to directly read the calculated kVp level.

The data stored in the memory 60 is precalculated to relate the ratio data on the address lines to kVp. Since the kVp of a three phase X-ray machine will be different from that for a single phase machine at the same detected ratio, separate memory locations are provided for three phase data and for single phase data. For example, the memory unit may be composed of two (or multiples of two, for extra memory capacity) 2716 EPROMs with parallel connected adddress and data buses. The mode switch 23 provides a chip select signal to the appropriate EPROM to cause three phase or single phase output data to be placed on the data lines 62. As an approximation, the data in the memory may relate kVp to ratio in accordance with the equation:

$$kVp = \left(\frac{C_1 T}{\log R}\right) C_2$$

where T is the difference in thicknesses of the filters, R is the detected ratio, and $C_1$ and $C_2$ are constants which may be determined by making measurements on calibrated single phase and three phase X-ray machines. However, the data stored in the EPROMs is preferably determined empirically by taking measurement with the device 20 of X-ray ratios from a calibrated X-ray machine (or from both a single phase and a three phase machine) at various kVp levels on the machine. The empirical relationships between ratio and kVp data, with interpolations if desired, may then be read into the EPROM memories at the appropriate memory locations. The same technique may be used to relate kVp to detected ratio using filters over the detectors which are composed of materials having differing X-ray attenuation and for determining half value layer data as a function of detected ratio.

The outputs of the current-to-voltage amplifiers 42 and 43 correspond, respectively, to the sums of the currents through the pairs of detector photodiodes 29 and 30, and will be related to the intensity of the X-ray beam incident upon the detectors. The detectors need not necessarily provide an output signal which is independent of the energy of the incident X-rays. Photodiodes, for example, typically have higher sensitivity for lower energy photons, which can be a source of inaccuracy in kVp measurement devices which assume energy independent detectors, but such effects are accounted for by utilizing the empirical kVp and detected ratio relationships loaded in the ROM memories. The ratio of the outputs of the amplifiers (or the detectors directly, if they provide a sufficiently large output) could thus be sampled to determine the kVp level. However, it is preferred that the integrators 49 and 50 be used to integrate the output of the amplifiers 42 and 43, respectively, to reduce the effect of time variations in the X-ray intensities reaching the detectors. The voltage outputs of the integrators 49 and 50 achieved when the integration is halted by the controller 48 will correspond to the outputs of the amplifiers 42 and 43 averaged over the period of integration. Of course, it is apparent that a separate divider could be utilized to divide the outputs of the integrators 49 and 50 to obtain a ratio voltage which could be applied to an analog-to-digital converter which would then supply a multi-bit address signal to the ROMs. The dual slope converter 57 (e.g., Intersil ICL7109) is preferred for convenience and simplicity since it both obtains the ratio of the voltage input signals and provides a digital output indicative thereof.

Figure 5:
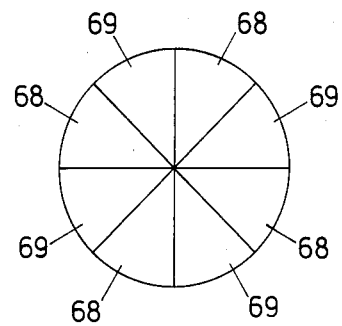
Figure 6:
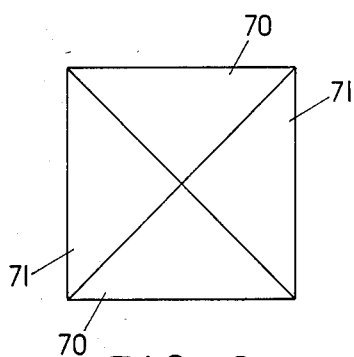
Figure 7:
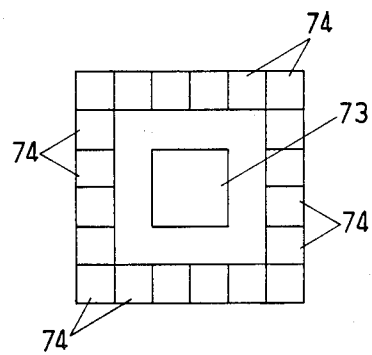
Figure 8:
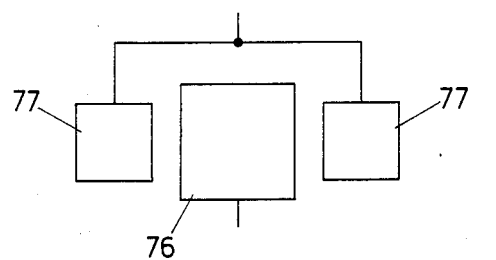

Alternative geometric arrangements for the detector units that satisfy the criterion of having coincident centers of areas are shown in FIGS. 4-8. In FIG. 4, the first detector 65 is circular and the second detector 66 is formed as a ring surrounding it. Such a detector is perfectly symmetrical and will provide consistent readings in any rotational orientation about its center point. In FIG. 5, the first detector units are formed of pie-shaped wedges 68 and the second detector units are formed of the adjacent pie-shaped wedges 69. The detectors may be formed as pie-shaped diagonal quadrants of a square, as shown in FIG. 6, having detector sections 70 forming the first detector unit and sections 71 forming the second detector unit. In FIG. 7, the first detector unit is formed as a single (square) detector 73 and the second detector unit is formed of a series of smaller square detector units 74 arranged to encircle the first detector 73. In the configurations of FIGS. 5-7, the outputs of the plural detectors in each detector unit would be connected so their output signals were added or averaged (e.g., connected in parallel for current producing photodiodes). In FIG. 8, the first detector is formed as a single large square 76 and the second detector unit is formed of two smaller square detectors 77 located on opposite sides of the first detector 76. The configuration of detectors in FIG. 8 allows the effect of rotational orientation to be reduced from that encountered with two adjacent detectors of the same size, although some output variation with orientation may occur in any arrangement of detectors which is not substantially symmetrical about the center of areas of the detector units. It may also be noted that the total areas of the first and second detector units need not necessarily be equal, since the sensitivity of the detector unit of smaller area may be greater, or the amplification of the signal provided from the detectors of smaller area may be increased to compensate for the difference in the total radiation receiving surface area of the detector units.

Figure 9:
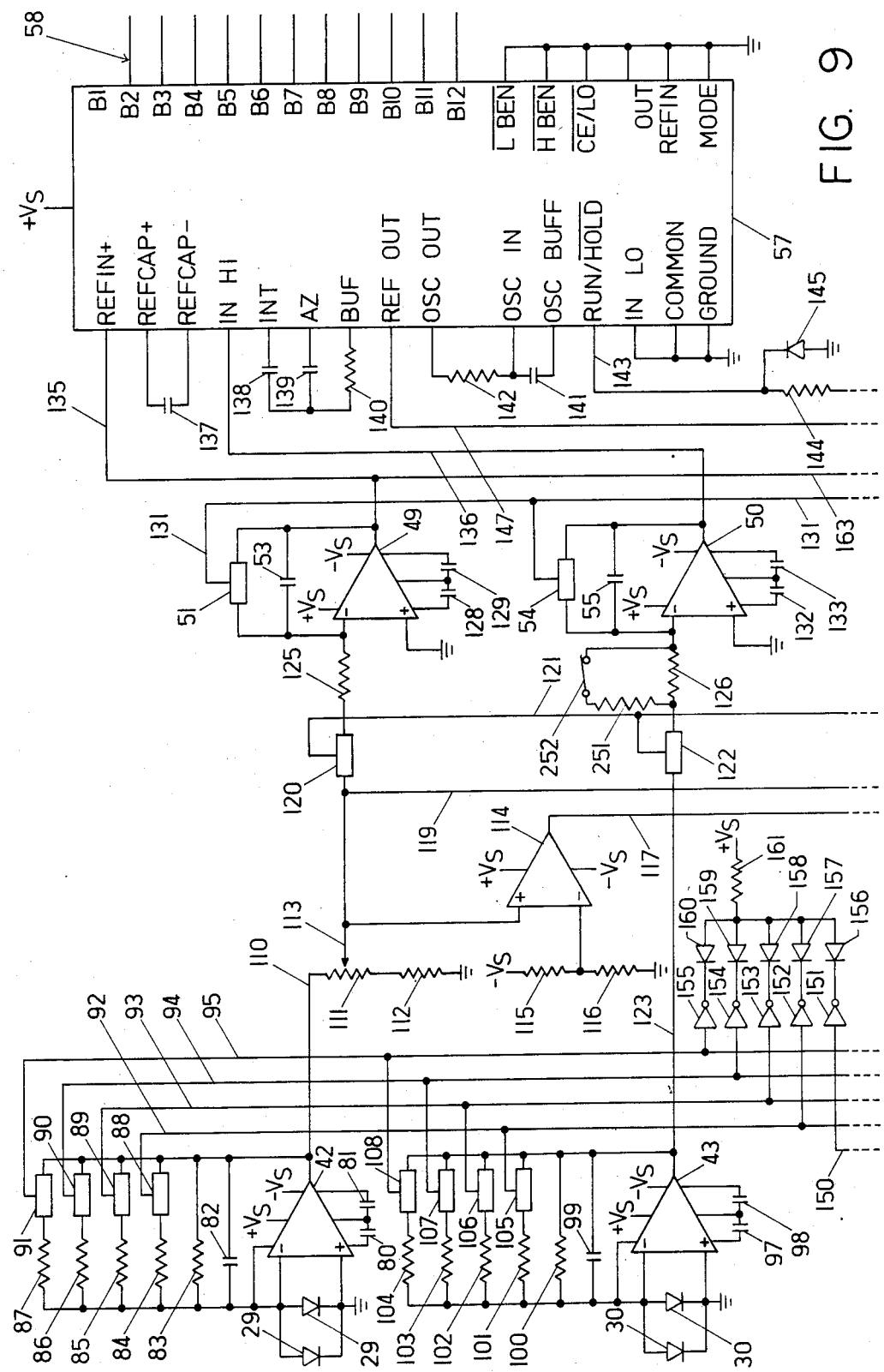
FIG. 9 is a schematic electrical circuit diagram showing a portion of the signal processing and control components of the invention.
Figure 10:
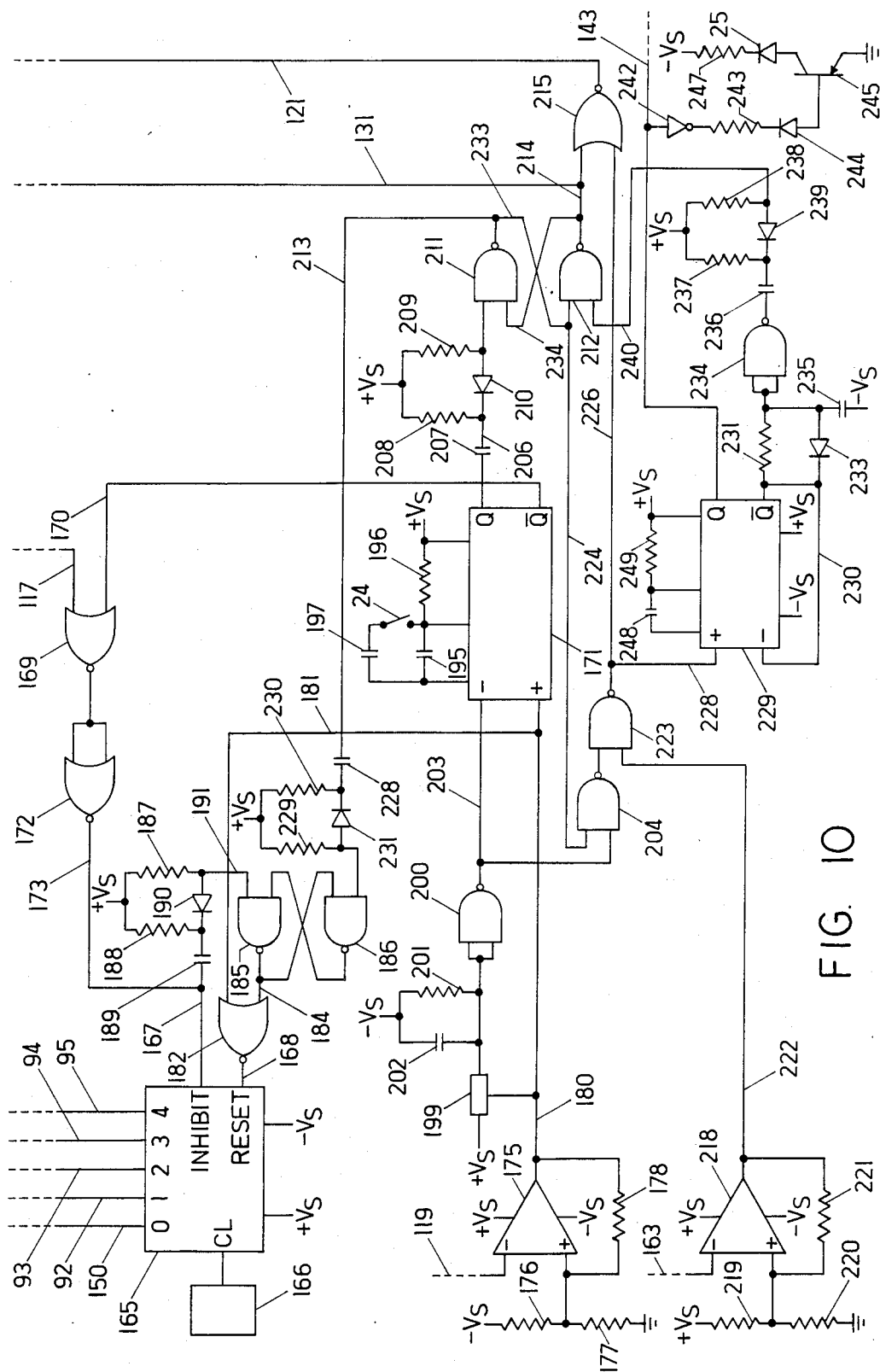
FIG. 10 is a schematic electrical circuit diagram showing the remaining portion of the signal processing and control components.

A detailed electrical schematic diagram for the gain control circuitry and the timing and control circuitry of the apparatus is shown in FIGS. 9 and 10. Preferably, CMOS integrated circuit components are utilized as appropriate to minimize power consumption. With reference to FIG. 9, the current signals from the photodiodes 29 are provided to the current-to-voltage amplifier 42 (e.g., ICL7650) with trim capacitors 80 and 81 and a feedback capacitor 82 connected thereto for amplifier stability and noise suppression, and a series of parallel feedback resistors 83-87. Connected in series with the resistors 84-87, respectively, are analog transmission gates (e.g., RCA 4016) 88-91 which are controlled by the voltage signals on control lines 92-95, respectively. Similarly, the current from the second detector unit photodiodes 30 is provided to the amplifier 43, which has capacitors 97 and 98 connected thereto and a feedback capacitor 99 for amplifier stability and noise suppression. A series of feedback resistors 100-104 are connected in parallel between the input and output of the amplifier 43 and transmission gates 105-108 are connected in series with the resistors 101-104, respectively. The control inputs to the gates 105-108 are connected to the control lines 92-95, respectively. Each of the resistors in the series 83-87 and 100-104 is of progressively lower resistance. Thus, the feedback resistances about the amplifiers 42 and 43, and therefore the effective gains of the amplifiers at their outputs, can be progressively decreased from an amplification where none of the lines 92-95 are high in steps by activating, in sequence of decreasing amplification, the lines 92, 93, 94, and 95.

The output of the amplifier 42 on its output line 110 corresponds to the radiation intensity passed through the single thickness of filter as detected by the diodes 29. The voltage signal on the line 110 is provided to a voltage divider composed of a potentiometer 111 and a fixed resistor 112. The wiper output 113 of the potentiometer is provided to the positive input of an amplifier 114, serving as a comparator, the negative input to which is provided from a voltage divider composed of resistors 115 and 116 supplied from the negative supply voltage (in the circuit diagram $-V_s$ corresponds to negative supply voltage and $+V_s$ corresponds to positive supply voltage). The output of the comparator 114 on its output line 117 will thus normally be high ($+V_s$) and will switch to low ($-V_s$) when the negative voltage output signal from the amplifier 42, as provided to the output wiper 113, is greater in absolute value than the voltage between the divider resistors 115 and 116. The voltage on the line 113 is also supplied to a connecting control line 119 leading to the timing and control circuitry shown in FIG. 10. The voltage signal on the line 113 is passed to an analog transmission gate 120 (e.g., 4016 CMOS gate) controlled by a control line 121 which also controls a transmission gate 122 which receives the output on a line 123 from the amplifier 43. The gates 120 and 122 act as switches and are normally open to block passage of the signals on the lines 113 and 123 when the voltage on the line 121 is low. When the control line 121 goes high, a connection is made from the line 113 to an input resistor 125 leading to the negative input of the integrating amplifier 49 (e.g., ICL 7650) and the voltage on the line 123 is supplied to an input resistor 126 connected to the negative input of the integrating amplifier 50. The amplifier 49 has stabilizing capacitors 128 and 129 connected thereto, the integrating feedback capacitor 53, and the feedback switch 51 connected across the capacitor 53, which is preferably also a transmission gate controlled by a control line 131. Similarly, the amplifier 50 has stabilizing capacitors 132 and 133 and the integrating feedback capacitor 55 and parallel feedback switch 54 (analog gate), the control input of which is also connected to the control line 131. The output of the integrating amplifier 49 is provided on an output line 135 to the reference input of the dual slope analog-to-digital converter 57, and the output of the amplifier 50 is provided on a line 136 to the high input of the converter 57. The preferred connections for the converter 57 (e.g., an Intersil ICL7109 12-bit A/D converter) are shown in FIG. 9, and the external components include a reference capacitor 137, integrator capacitors 138 and 139 and buffer resistor 140, and an oscillator capacitor 141 and resistor 142. The run/hold input to the converter 57 is provided on a line 143 supplied through a resistor 144 and diode 145 which clamp the low voltage on the line 143 to substantially zero volts. When the input signal to the converter 57 on the line 143 is high, the converter will run and proceed to calculate the ratio of the voltages on the lines 135 and 136, providing a parallel multi-bit digital output signal on the bus 58 (11 bits used) corresponding to the ratio. When the signal on the line 143 is low, the ratio is not calculated and the output data on the lines 58 is held. A reference output from the converter 57 is provided on an output line 147.

The control lines 92-95 which control the switching of the transmission gates 88-91 and 100-108, plus an additional control line 150, are provided to a series of inverting buffer amplifiers 151-155, the outputs of which are connected through light emitting diodes 156-160, respectively, to a common point which is connected through a resistor 161 to positive supply voltage. The LED diodes can be accessed by a technician, if desired, to check the gain state of the amplifiers 42 and 43 for diagnostic purposes.

As noted above, the comparator 114 compares the voltage on the line 113 with its reference voltage and, if the voltage is above the selected reference voltage level in absolute value, a low output will be provided on the line 117 to allow a sequential change of gain of the amplifiers 42 and 43 in steps by sequentially raising the lines 92, 93, 94 and 95 high. At each step of gain change, if the voltage at the line 113 decreases below the compared voltage, the comparator output on the line 117 will go high, inhibiting any further changes in gain, as explained further below with reference to the circuit of FIG. 10. In addition, it is noted that the output of the line 117 will be high also if no X-ray exposure is being made so that gain change of the amplifiers is inhibited during this quiescent period. The control signal on the line 121 is normally low, so that the gates 120 and 122 are open, thereby allowing no input to be provided to the integrating amplifiers 49 and 50. The gates 51 and 52, which are connected across the feedback capacitors 53 and 55, are normally closed by placement of a high signal on the line 131 prior to an X-ray exposure and during the initial period of exposure. After an initial delay following initiation of an X-ray exposure, the line 121 goes high and the line 131 goes low, so that the output on the lines 113 and 123 is passed to the integrating amplifiers, which proceed to integrate their input signals. The output of the integrator 49 is provided on a line 163 to the timing and control circuitry which senses when the output of the integrating amplifier 49 has reached a selected level, or when a selected delay time (e.g., 100 msec) has elapsed, whereupon the signal on the line 121 goes low and the gates 120 and 122 are opened. The outputs from the integrators, as transmitted to the converter 57 on the lines 135 and 136, will thereafter remain constant and the ratio of these signals can be converted by the converter 57 to a digital output signal.

The circuitry which accomplishes the control of the gain of the amplifiers 42 and 43 is illustrated in FIG. 10, wherein the lines 150 and 92-95 extend from the outputs of a counter 165 (e.g., a 4017 5-stage Johnson counter with integral 1-of-10 decoding) which is provided with a clock pulse input from a clock 166. High output signals are sequentially provided from the unit 165, as driven by the clock 166, on lines 150, 92, 93, 94 and 95, in sequence, and returning, if the cycle is not stopped, back to the line 150. When the counter 165 receives a high signal at its inhibit input on a line 167, the cycling of high outputs amongst the lines 150 and 92-95 is halted. A high signal on a line 168 to the reset input of the counter resets it to cycle again beginning with an output on the line 150.

The signal on the line 117, which will be low if the output of the amplifier 42 is above a desired voltage level defining the maximum range, is provided to a NOR gate 169, the other input of which is provided on a line 170 leading from the inverted output of a monostable multivibrator 171 (e.g., 4098 monostable). The output of the NOR gate 169 is provided to another NOR gate 172, the output of which is connected to a line 173 leading to the inhibit input line 167. The output signal on a line 173 will thus be the OR function of the signals on the lines 117 and 170, and since the line 170 is initially high, the counter 165 will be inhibited prior to an X-ray exposure. After an X-ray exposure begins, to determine if the X-ray intensity is of a level sufficient to provide reliable readings, the voltage output from the amplifier 42 is supplied via the line 119 to the negative input of an amplifier 175 which compares the negative input voltage on the line 119 with a voltage provided across a divider composed of resistors 176 and 177 and a feedback resistor 178. The output of the comparator amplifier 175 on a line 180 is ordinarily low if the voltage output from the amplifier 142 is zero or below the desired threshold voltage, and high if the voltage on the line 119 exceeds the threshold. When the signal on the line 180 goes high, indicating that a sufficient voltage level has been achieved to obtain reliable readings, the monostable 171 is triggered to change states, and the inverted output on the line 170 goes low, removing the inhibit on the line 167 if the signal on the line 117 is low also and allowing the counter 165 to cycle outputs on the lines 150 and 92-95. The high signal on the line 180 is also supplied through a line 181 to one input of a NOR gate 182, the output of which is connected by the line 168 to the reset input of the counter 165. Since the line 180 is now high, the signal on the line 168 is now low and no reset signal is supplied to the counter. The counter thus begins to cycle by putting a high signal on the line 150, and a low signal on lines 92 to 95 thus placing only resistor 83 in the feedback path about the amplifier 42, and resulting in the highest possible gain for the amplifier. If the output voltage provided to the comparator 114 is too large in magnitude, the output signal on the line 117 will be low and the counter 165 will proceed to cycle to the next state, providing a high output signal on the line 92 and low output signals on the remainder. This will now place the resistor 84 into the feedback loop about the amplifier 42 along with the resistor 83. If the signal on the line 117 remains low, the cycle will be repeated, placing high signals on the other input lines 93, 94 and, finally, 95 until the magnitude of the output of the amplifier falls below the threshold voltage level, at which point the comparator 114 changes state to put a high signal on the line 117, and thereby provide a high inhibit signal on the line 167 to the counter to hold the selected gain setting. The other input to the NOR gate 182 is provided on a line 184 leading from the output of a NAND gate 185 which is arranged in a flip-flop configuration with another NAND gate 186. The output of the NAND gate 185 forms one of the inputs of the NAND gate 186 and the output of the NAND gate 186 forms one of the inputs of the gate 185. The other input to the gate 185 is provided from a pulse triggering circuit composed of resistors 187 and 188, a capacitor 189, and a series diode 190. It is seen that the pulse trigger circuit ordinarily provides a high signal on the line 191 leading to the input of the NAND gate 185 but that if the signal on the line 173 drops low again, to remove the inhibit from the counter 165, a negative pulse will be provided through the line 191 to the NAND gate 185, causing the gates 185 and 186 to change state so that the input on the line 184 to the NOR gate 182 will be high.

The triggering of the monostable 171 causes it to change state for a selected period of time. The time delay can be selected by the operator to either the radiographic or fluoroscopic mode by selection of the switch 24, which in the radiographic mode is open so that only the single capacitor 195 is connected to the monostable 171, along with a resistor 196, which together determine the on period for the monostable. With the switch 24 closed, a second capacitor 197 is placed in parallel with the first capacitor 195, providing a much higher effective capacitance to the monostable 171 and substantially increasing the selected on-time of the monostable. For example, the on-time delay in the radiographic mode may be about 30 milliseconds, which allows sufficient time for the counter/decoder 165 to carry out the gain adjustments on the amplifiers 42 and 43. In the fluoroscopic mode, with the switch 24 closed and the capacitor 197 in parallel with the capacitor 195, a satisfactory on delay time for the monostable may be approximately 1.2 seconds, which assures sufficient time for cable charging and kVp stabilization during fluoroscopy.

The high signal on the line 180 also turns on an analog switch 199 which passes positive supply voltage to an inverting NAND gate 200 (preferably a 4093 NAND Schmitt trigger) which, when the gate 199 is open, is supplied with negative supply voltage through a parallel resistor 201 and capacitor 202. Thus, before the signal on the line 180 goes high, the output of the gate 200 on an output line 203 is high and goes low as the signal 180 goes high, and the signal on the line 203 is provided to the negative input of the monostable 171 and to one of the two inputs of a NAND gate 204. When the signal on line 180 goes high, the signal on line 203 goes low after a very short delay as the capacitor 202 is charged through the small resistance of the transmission gate 199. With the signal on the line 203 low, the monostable 171 cannot be retriggered. If the signal on the line 180 goes low, opening the switch 199, the discharge of the capacitor 202 through the resistor 201 will maintain the signal on the line 203 high for a delay period (e.g., 100 msec) to ensure that retriggering of the monostable 171 with short excursions of the X-ray output below the threshold during an exposure (e.g., as may happen with single phase systems).

The non-inverted output of the monostable 171 is provided on a line 206 to a capacitor 207 forming part of a pulse-shaping circuit with resistors 208 and 209 and a diode 210 which lead to one of the NAND gates 211 of a flip-flop which is formed with a second NAND date 212. Because a high supply voltage is provided through resistors 208 and 209 to the input of the NAND gate 211, the output of the NAND gate as provided on a line 213 will normally be low if the NAND gate 212 is initially high. The output of the NAND gate 212 is provided on a line 214 to which the control line 131 is connected. Thus, the line 131 will initially have a high voltage and will initially close the transmission gates 51 and 54 which are connected across the integrating capacitors 53 and 55. The output of the NAND gate on the line 214 is provided to one of the inputs of a NOR gate 215, the output of which is connected to the line 121. Since the line 214 will initially be high, the output of the NOR gate 215 on the line 121 will initially be low, so that the gates 120 and 122 through which input signals are connected to the integrating amplifiers 49 and 50 are initially open and no signals are passed. It will be noted that, when the non-inverting output of the monostable 171 on the line 206 goes high, the input to the NAND gate 211 will not change since the input is normally high as provided from the supply voltage through the resistor 209. Thus, the gates 120 and 122 will remain open and the gates 51 and 54 will remain closed during the on-time of the monostable 171.

During the initial delay period of the monostable 171, the closure of the switch 51 about the amplifier 49 will clamp the output of the amplifier, as provided on the line 163, at ground. This ground level is supplied to the negative input of a comparator amplifier 218, the positive input of which is provided with a positive voltage across a voltage divider composed of resistors 219 and 220 and a feedback resistor 221. With the signal on the line 163 initially being at ground, the output of the amplifier 218 on its output line 222 will initially be high. The high signal on the line 222 is provided to one input of a NAND gate 211, the other input of which is connected to the output of the NAND gate 204. During the initial delay period of the monostable 171, the inputs to the NAND gate 204 are the low signal on the line 203 and the low signal from the NAND gate 211 provided on a line 224. The output of the NAND gate 204 will thus be high and, since both inputs of the NAND gate 223 are thus high, the output of the NAND gate 223 will initially be low. This output is provided on a line 226 to the other input of the NOR gate 215. However, since the other input to the NOR gate 215 on the line 214 is initially high, the output of the NOR gate on the line 121 remains initially low.

The low initial output state of the NAND gate 211 is provided on the line 213 through a capacitor 228 to a paralleled resistors 229 and 230, connected to positive supply voltage, and a series diode 231 leading to one of the inputs to the NAND gate 186. Although the initial state of the line 213 is low, the input to the NAND gate 186 stabilizes at the high supply voltage and the output of the NAND gate 186 remains in its high state due to the initial low state of the NAND gate 185 output supplied to the other input of the NAND gate 186.

When the monostable 171 times out, the inverting output on the line 170 goes high and is passed through to the line 173 to the inhibit input of the counter 165, thereby preventing any further gain changes. The non-inverting output of the monostable on the line 206 goes low, passing a negative pulse through the capacitor 207 and the series diode 210 to the NAND gate 211. Since one of the inputs to the NAND gate is now low, its output goes high and is provided on a line 233 to the input of the NAND gate 212 which goes low and provides its low output on a line 234 to the other input of the NAND gate 211, holding the output of that NAND gate high. The capacitor 207 eventually charges from the positive supply voltage so that the input to the NAND gate 211 goes high again; however, the NAND gate 211 remains in its switched state with its output high on the line 213. The high signal on the line 213 discharges the capacitor 228, but the input to the NAND gate 186 remains high and no change of state occurs. The high signal on the line 224 is passed to the NAND gate 204, the output of which remains high since the output of the NAND gate 200 remains high. The output of the NAND gate 223 on the line 226 thus remains low. The low output of the NAND gate 212 on the line 214 is passed to the line 131 to open the analog gates 51 and 54 so that the integrating capacitors 53 and 55 can charge, and, since both the input signals on the lines 214 and 226 to the NOR gate 215 are low, the output of the NOR gate on the line 121 is high, closing the analog gates 120 and 122 to allow an input signal to the integrating amplifiers 49 and 50.

The integration of the input signal by the amplifiers 49 and 50 continues until one of two conditions occurs. First, if the output voltage from the amplifier 49 as provided on the line 163 exceeds the selected maximum voltage as determined by the voltage across the voltage divider at the positive input to the comparator amplifier 218, the output of the amplifier 218 on the line 222 goes low and the output of the NAND gate 223 goes high. Second, if the output of the comparator 175 remains negative for a selected time period indicating that the X-ray exposure has terminated (e.g., 100 msec), the capacitor 202 discharges to a level at which the Schmitt trigger 200 switches to a high output which is supplied to the NAND gate 204. The other input to the NAND gate 204 on line 224 is normally high at this time, such that the gate 204 goes low and the output of the NAND gate 223 goes high. The high signal on the line 226 from the gate 223 causes the output of the NOR gate 215 on the line 121 to go low, opening up the analog gates 120 and 122 so that no further input voltage is provided to the amplifiers 49 and 50 and output of these amplifiers remains clamped at the voltage across the amplifiers at this time. The high output from the NAND gate 223 is also provided at this time on a line 228 to the positive input of a monostable 229. Prior to activation of the monostable 229, its low non-inverting output was connected by the line 143 to the run/hold input of the analog-to-digital converter 57, holding the previous data at the output lines 58 of the converter. Upon switching of the monostable into its high state, the converter 57 is put into the run mode and it provides output data corresponding to the ratio of the voltages on the lines 135 and 136. Since the integrators 49 and 50 have stopped integrating and the voltages at their outputs are essentially stable, an essentially stable signal is provided to the converter 57.

The initial high, unswitched, non-inverting output of the monostable 229 was provided on a feedback line 230 to the negative input of the monostable and through a resistor 231 with parallel diode 232 to an inverting NAND gate 234. A capacitor 235 is connected between the negative supply voltage and the input to the inverting gate 234. With the initial high output from the monostable 229, the input to the NAND gate 234 is high and its output low. This low output charges a capacitor 236 which is connected to paralleled resistors 237 and 238 and a series diode 239 which are connected by a line 240 to the second input of the NAND gate 212. The positive supply voltage connected via the resistors 237 and 238 to the line 240 initially provides a high input signal on the line 240 to the NAND gate 212. The switching of the monostable, so that the inverting output goes low, results in the inverted output of the NAND gate 235 going high, and the input on the line 240 to the NAND gate 212 remains high. The high output signal on the line 143 is provided to an inverting amplifier 242, the output of which is connected through a resistor 243 and diode 244 to the base of a transistor 245. The low voltage applied to the base of the transistor 245 turns it on, passing current through the light emitting diode 25 and a resistor 247 which are connected between the collector of the transistor 245 and negative supply voltage. The lighting of the diode 245 thus indicates to the operator that the integration phase has been completed and computation of the ratio of the integrated signals is being performed by the converter 57. The on-time delay period of the monostable 229 is determined by a capacitor 248 and resistor 249. When the monostable 229 times out and returns to its initial state, the non-inverting output on the line 143 goes low, turning off the light emitting diode 25 and providing a hold input to the converter 57 to hold the data signals on the output lines 58. The inverting output of the monostable 229 goes high, causing the output of the inverting NAND gate 234 to go low. The low voltage output of the NAND gate 234 is transmitted as a pulse through the capacitor 236 and the diode 239 to one of the inputs of the NAND gate 212, causing its output to go high, and switching the output of the NAND gate 211 low. The input signal on the line 240 to the NAND gate 212 eventually returns high as the capacitor 236 charges up but the gates 211 and 212 remain stable in their new switched states. The high signal on the output line 214 from the NAND gate 212 is provided to the line 131, closing the switches 51 and 54 and discharging the capacitors 53 and 55. Since the line 214 is now high, the output of the NOR gate 215 on the line 121 remains low and the gates 120 and 122 remain in their open state in which no signal is passed through them. The low signal on the line 213 is passed as a pulse through the capacitor 228 and the diode 231 to the NAND gate 186, switching its output high and switching the output of the NAND gate 185 low. The low output of the NAND gate 185 passed on the line 184 to the NOR gate 182 will send a reset signal to the counter 165 if (or when) the X-ray exposure has ceased and the output of the comparator 175 on the line 180 is low.

The closing of the gates 51 and 54 will clamp the output of the amplifiers 49 and 50 at ground voltage, which will be supplied on the line 163 to the comparator 218, the output of which on the line 122 will now go high. The timing and control circuit has thus now returned to its initial state in which it holds the data for the last exposure on the output lines 58 from the converter 57 and is in a state where the device is ready to receive a new exposure and automatically recycle.

The device 20 can readily be adapted to provide half value layer measurements. This can be accomplished by removing the filter 40 so that the radiation reaching the detector 29 is unfiltered and replacing the ROM memory 60 with a memory which has been preprogrammed to provide empirically determined half value layer data in accordance with an appropriate test procedure.

It is also possible to operate the device in a self-check mode to determine if any changes have occurred in the operating characteristics of the device over time. To carry out the self check procedure, the filters 40 and 41 are removed and replaced by a single filter of uniform thickness and the same material which is applied over both detectors 29 and 30. Alternatively, an extra layer of filter can be applied over the detector 29 so that the detectors 29 and 30 are covered by a uniform thickness of filter of the same material. An optional resistor 251 and switch 252 may be connected across the input resistor 126. The switch 252 would be opened by the operator during the self check mode to reduce the gain at the integrating amplifier 50 if the filters 40 and 41 are replaced by a single thinner filter so that the integrator does not saturate. The device 20, so modified, is then exposed to X-rays at any kVp level and the output reading recorded. Since the detectors 29 and 30 are exposed to identical radiation intensity, the ratio of the signals from the detectors should always be constant for every exposure taken through the same filter. Thus, the device, with the same (or equivalent) filter applied over the detectors, may be exposed to another beam of X-rays at a later time and the displayed measurement compared with the earlier measurement. While the value of the output displayed to the operator has no particular meaning, a substantial change in the value from one exposure to the next (e.g., more than a few percent) indicates that the operating characteristics of the device have changed.

It is understood that the invention is not confined to the particular construction and arrangement of parts herein illustrated and described, but embraces such modified forms thereof as come within the scope of the following claims.

What is claimed is:

1. Apparatus for the measurement of the characteristics of an X-ray beam from an X-ray machine comprising:
   (a) first detector unit means for providing an output signal related to the intensity of the X-ray radiation incident on it which passes through an X-ray filter of a first attenuation characteristic;
   (b) second detector unit means, adjacent to the first detector unit means, for providing an output signal related to intensity of the X-ray radiation incident on it which passes through an X-ray filter of a second attenuation characteristic different than that of the X-ray filter for the first detector unit means;
   (c) first integrator means for integrating the signal from the first detector means and providing an output signal indicative thereof;
   (d) second integrator means for integrating the signal from the second detector means and providing an output signal indicative thereof;
   (e) conversion means for determining the ratio of the integrated first detector signal and the integrated second detector signal and providing a multi-bit digital output signal on parallel lines;
   (f) memory means, having address input lines connected to the parallel output lines from the conversion means, for providing an output of data stored at an address location corresponding to the multi-bit input signal on the address lines such that the output data from the memory means is indicative of a selected characteristic of the X-ray beam received by the first and second detector unit means;
   (g) display means for receiving the output data signal from the memory means and for providing a display to an operator which corresponds to the data from the memory means; and
   (h) timing and control means for determining when the magnitude of the output signal of the first integrator means exceeds a predetermined level and thereafter holding the output signal levels of the first and second integrator means constant to allow such levels to be readily compared by the conversion means to determine a ratio output signal which remains substantially constant.

2. The apparatus of claim 1 including:
   first variable gain amplifier means, connected to receive the signal from the first detector unit means, for providing an amplified signal to the first integrator means at a gain level controlled in response to a control signal,
   second variable amplifier means, connected to receive the signal from the second detector unit means, for providing an amplified signal to the second integrator means at a gain level controlled in response to a control signal.

3. The apparatus of claim 2 including gain control means, responsive to the output of the first amplifier means, for providing control signals to the first and second amplifier means to adjust the gain thereof simultaneously until the magnitude of the output from the first amplifier means is below a selected maximum, and thereafter maintaining the gain level.

4. The apparatus of claim 3 wherein the first and second amplifier means each includes a high gain amplifier and a plurality of feedback resistors of different resistance values connected in parallel with one another between the input and output of the amplifier, and control signal responsive gates connected in series with at least all but one of the feedback resistors, and wherein the gain control means provides a control signal simultaneously to the gates in both the first and second amplifier means in a sequence to bring progressively lower resistance resistors into the feedback loop about the amplifiers until the magnitude of the output from the first amplifier means is below a selected maximum.

5. The apparatus of claim 3 wherein the timing and control means is responsive to the magnitude of the output signal from the first amplifier means and includes means for initially blocking the transmission of the signal from the first and second amplifier means to the first and second integrator means, for determining when the output signal from the first amplifier means exceeds a predetermined threshold level, thereafter delaying for a selected period of time to allow adjustment of the gain of the first and second amplifier means and, after the selected period of time has elapsed, transmitting the output signals from the first and second amplifier means to the first and second integrator means to allow them to integrate the output signals.

6. The apparatus of claim 1 wherein the detector unit means are arranged in a plane with the centers the areas of each unit which are responsive to X-rays being coincident so that variations in the outputs of the detector units with charges in their orientation with respect to the X-ray beam are minimized.

7. The apparatus of claim 6 wherein each detector unit means comprises a pair of detectors providing an electrical output signal and being electrically connected in parallel with one another, the four detectors in the first and second detector unit means arranged symmetrically in a plane in four quadrants with each pair of detectors which constitute a single detector unit means disposed in diagonally opposite quadrants.

8. The apparatus of claim 7 wherein the detectors comprise photodiodes providing an electrical output signal in response to incident X-rays.

9. The apparatus of claim 1 wherein the output data from the memory means is indicative of the kVp of the X-ray machine from which the X-ray beam is received by the first and second detector unit means.

10. The apparatus of claim 1 wherein the X-ray filters are formed of the same material and wherein the X-ray filter for the first detector unit means is substantially thicker than the X-ray filter for the second detector unit means.

11. Apparatus for the measurement for the kVp level of an X-ray machine by measurement of the characteristics of the X-ray beam comprising:
 (a) first detector unit means for providing an output signal related to the intensity of the X-ray radiation incident on it which passes through an X-ray filter of a first attentuation characteristic;
 (b) second detector unit means, adjacent to the first detector unit means, for providing an output signal related to the intensity of the X-ray radiation incident on it which passes through an X-ray filter of a second attenuation characteristic different than that of the X-ray filter for the first detector unit means;
 (c) first variable gain amplifier means, connected to receive a signal from the first detector unit means, for providing an amplified output signal at a gain level controlled in response to a control signal;
 (d) second variable amplifier means, connected to receive the signal from the second detector unit means, for providing an amplified output signal at a gain level controlled in response to a control signal;
 (e) gain control means, responsive to the output signal of the first amplifier means, for providing control signals to the first and second amplifier means to adjust the gain thereof simultaneously until the magnitude of the output from the first amplifier means is below a selected maximum level, and thereafter maintaining the gain level;
 (f) means responsive to the outputs of the first and second amplifier means for generating an indication of the kVp voltage applied to the X-ray machine from which the X-rays were received by the first and second detector means.

12. The apparatus of claim 11 wherein the means responsive to the outputs of the first and second amplifier means includes:
 (a) first integrator means for integrating the signal from the first amplifier means and providing an output signal indicative thereof;
 (b) second integrator means for integrating the signal from the second amplifier means and providing an output signal indicative thereof;
 (c) conversion means for determining the ratio of the integrated first detector signal and the integrated second detector signal and providing a multi-bit digital output signal on parallel lines;
 (d) memory means, having address input lines connected to the parallel output lines from the conversion means, for providing an output of data stored at an address location corresponding to the multi-bit input signal on the address lines such that the output data from the memory means is indicative of the kVp level of the X-ray machine from which the X-ray beam is received by the first and second detector unit means; and
 (e) display means for receiving the output data signal from the memory means and for providing a display to an operator which corresponds to the data from the memory means.

13. The apparatus of claim 11 wherein the first and second amplifier means each includes a high gain amplifier and a plurality of feedback resistors of different resistance values connected in parallel with one another between the input and output of the amplifier and control signal responsive gates connected in series with at least all but one of the feedback resistors, and wherein the means responsive to the output of the first amplifier means provides a control signal simultaneously to the gates in both the first and second amplifier means in a sequence to bring progressively lower resistance resistors into the feedback loop about the amplifiers until the magnitude of the output from the first amplifier means is below a selected maximum.

14. The apparatus of claim 12 including timing and control means, responsive to the magnitude of the output signal from the first amplifier means, for initially blocking the transmission of the signal from the first and second amplifier means to the first and second integrator means, for determining when the output signal from the first amplifier means exceeds a predetermined threshold level, thereafter delaying for a selected period of time to allow adjustment of the gain of the first and second amplifier means and, after the selected period of time has elapsed, transmitting the output signals from the first and second amplifier means to the first and second integrator means to allow them to integrate the output signals, for determining when the magnitude of the output signal of the first integrator means exceeds a predetermined maximum level or that the X-ray exposure has terminated and thereafter blocking transmission of signals from the first and second amplifier means to the first and second integrator means to hold the output signal levels of the first and second integrator means to allow such levels to be readily measured and compared by the conversion means.

15. The apparatus of claim 11 wherein the detector unit means are arranged in a plane with the centers of the areas of each unit which are responsive to X-rays being coincident so that variations in the outputs of the detector units with changes in their orientation with respect to the X-ray beam are minimized.

16. The apparatus of claim 15 wherein each detector unit means comprises a pair of detectors providing an electrical output signal and being connected electrically in parallel with one another, the four detectors in the first and second detector unit means arranged symmetrically in the four quadrants of a square with each pair of detectors which constitute a single detector unit means disposed in diagonally opposite quadrants.

17. The apparatus of claim 15 wherein the detectors are photodiodes which provide an electrical output signal in response to X-rays incident thereon.

18. The apparatus of claim 11 wherein the X-ray filters are formed of the same material and wherein the X-ray filter for the first detector unit means is substantially thicker than the X-ray filter for the second detector unit means.

19. Apparatus for determining the kVp characteristics of an X-ray machine from measurements of the X-ray beam from the machine, comprising:

(a) a first detector unit formed of a pair of detectors which provide an electrical output signal in response to incident X-rays and electrically connected in parallel with one another, a second detector unit formed of a pair of detectors providing an electrical output signal in response to incident X-rays and electrically connected in parallel with one another, the detectors in the first and second detector units arranged symmetrically in a plane in four quadrants with each pair of detectors which constitute a single detector unit disposed in diagonally opposite quadrants, and an X-ray filter of a first attenuation characteristic over the detectors in the first detector unit and an X-ray filter of a second attenuation characteristic over the detectors in the second detector unit; and (b) means responsive to the outputs of the first and second detector unit for providing an indication of the kVp level applied to the X-ray machine from which the X-rays were received by the first and second detector units, the means responsive comprising:

(1) first and second amplifier means for receiving the signals from the first and second detector units and amplifying the same;

(2) first integrator means for integrating the signal from the first amplifier means and providing an output signal indicative thereof;

(3) second integrator means for integrating the signal from the first amplifier means and providing an output signal indicative thereof;

(4) conversion means for determining the ratio of the integrated first detector signal and the integrated second detector signal and providing a multi-bit digital output signal on parallel lines;

(5) memory means, having address input lines connected to the parallel output lines from the conversion means, for providing an output of data stored at an address location corresponding to the multi-bit input signal on the address lines such that the output data from the memory means is indicative of the kVp level of the X-ray machine from which the X-ray beam is received by the first and second detector unit means; and (6) display means for receiving the output data signal from the memory means and for providing a display to an operator which corresponds to the data from the memory means.

20. The apparatus of claim 19 including timing and control means, responsive to the magnitude of the output signal from the first amplifier means, for initially blocking the transmission of the signal from the first and second amplifier means to the first and second integrator means, for determining when the output signal from the first amplifier means exceeds a predetermined threshold level, thereafter delaying for a selected period of time, and, after the selected period of time has elapsed, transmitting the output signals from the first and second amplifier means to the first and second integrator means to allow them to integrate the output signals, for determining when the magnitude of the output signal of the first integrator means exceeds a predetermined maximum level or that the X-ray exposure has terminated and thereafter blocking transmission of signals from the first and second amplifier means to the first and second integrator means to hold the output signal levels of the first and second integrator means to allow such levels to be readily measured and compared by the conversion means.

21. The apparatus of claim 19 wherein the first and second amplifier means provide an amplified signal to the first and second integrator means, respectively, at a gain level controlled in response to a control signal, and including gain control means, responsive to the output of the first amplifier means, for providing control signals to the first and second amplifier means to adjust the gain thereof simultaneously until the magnitude of the output from the first amplifier means is below a selected maximum, and thereafter maintaining the gain level.

22. The apparatus of claim 21 wherein the first and second amplifier means each includes a high gain amplifier and a plurality of feedback resistors of different resistance values connected in parallel with one another between the input and output of the amplifier and control signal responsive gates connected in series with at least all but one of the feedback resistors, and wherein the gain control means provides a control signal simultaneously to the gates in the first and second amplifier means in a sequence to bring progressively lower resistance resistors into the feedback loop about the amplifiers until the magnitude of the output from the first amplifier means is below a selected maximum.

23. The apparatus of claim 19 wherein the detectors are photodiodes which provide an electrical output signal in response to X-rays incident thereon.

24. The apparatus of claim 19 wherein the X-ray filters are formed of the same material and wherein the X-ray filter over the detectors in the second detector unit is substantially thicker than the X-ray filter over the detectors in the first detector unit.

25. The apparatus of claim 24 wherein the X-ray filters are formed of copper.

26. A method of measuring the kVp characteristics of an X-ray machine from measurements of the X-ray beam from the machine, comprising the steps of:

(a) detecting the X-ray intensity of the X-ray beam passed through a first X-ray filter of a first attenuation characteristic and providing a signal indicative thereof and integrating the signal for a selected period of time and thereafter holding the integrated signal constant;

(b) detecting the X-ray intensity of the X-ray beam passed through a second X-ray filter of a second attenuation characteristic and providing a signal indicative thereof and integrating the signal for the selected period of time and thereafter holding the integrated signal constant;

(c) determining the ratio of the integrated signals indicative of the X-ray intensities passed through the first and second filters and providing a digital signal corresponding to the ratio;

(d) associating the digital signal corresponding to the ratio with a memory address location at which is stored data corresponding to a kVp level predetermined to be related to the ratio and displaying the kVp level so determined to an operator.

* * * * *

REEXAMINATION CERTIFICATE (1327th)
United States Patent
Zarnstorff et al.

[11] B1 4,697,280
[45] Certificate Issued  Jul. 17, 1990

[54] METHOD AND APPARATUS FOR THE MEASUREMENT OF X-RAY SOURCES

[75] Inventors: William C. Zarnstorff; Frank N. Ranallo, both of Madison, Wis.

[73] Assignee: Wisconsin Alumni Research Foundation, Madison, Wis.

Reexamination Request:
No. 90/001,711, Feb. 7, 1989

Reexamination Certificate for:
Patent No.: 4,697,280
Issued: Sep. 29, 1987
Appl. No.: 648,020
Filed: Sep. 6, 1984

[51] Int. Cl.$^5$ .............................................. G01D 18/00
[52] U.S. Cl. .................................. 378/207; 250/252.1; 378/19

[56] References Cited

U.S. PATENT DOCUMENTS

| | | |
|---|---|---|
| 3,515,873 | 6/1970 | Higgins et al. |
| 3,766,383 | 10/1973 | Harris et al. |
| 3,973,128 | 8/1976 | LeMay |
| 4,097,736 | 6/1978 | Jacobson et al. |
| 4,136,281 | 1/1979 | Murray |
| 4,189,645 | 2/1980 | Chaney et al. |
| 4,203,033 | 5/1980 | Jacobson |
| 4,225,316 | 9/1980 | Lewin |
| 4,292,538 | 9/1981 | Carlson |
| 4,300,049 | 11/1981 | Sturm |
| 4,355,230 | 10/1982 | Wilson et al. |
| 4,361,900 | 11/1982 | Siedband |
| 4,400,821 | 8/1983 | Aichinger et al. |
| 4,442,496 | 4/1984 | Simon et al. |
| 4,697,280 | 9/1987 | Zarnstorff et al. |

OTHER PUBLICATIONS

Photon Physics Inc. Model kV-1 Kilovoltage Computer Instruction Manual, publication date unknown.
J. N. Haywood, et al., "An Evaluation of Eight Non-Invasive Electronic kV Measuring Instruments Which are Commercially Available in the U.K.", FAXILE Assessment No. 21, STB 6E/85/19, Facility for the Assessment of X-ray Imaging Leeds University, England, published London, England, Jun. 1985.
Keithley Instrument, Inc. Model 35070 kVp Meter Users Manual, Manual No. 32628IM, Revision A, Oct. 1982.
"An Instrument with Digital Readout for Indirect Determination of kVp", Edward L. Chaney, William R. Hendee, Med. Phys. 5(2), Mar./Apr. 1978, pp. 141-145.
Advertisement for "Nero" radio beam analyzer.
Advertisement for "Digi-X", X-ray Detector produced by ScanFlex Medical AB.
Advertisement for Model 35070 Digital kVp Meter produced by Keithley Instruments, Inc.
Advertisement for Model 1KV Measuring Instrument by Photon Physics.
Advertisement "Got QA Problems? We've Got Solutions" Medical Physics, vol. 9, No. 2, Mar./Apr. 1982.
Advertisement "kVp Measurements", Medical Physics, vol. 9, No. 5, Sep./Oct. 1982.
National Semiconductor Corporation *Linear Data Book*, Copyright 1982.
Interstil catalog, pp. 3-93 through 3-97, Copyright 1983.
*Electronic Devices and Circuits*, Millman and Halkias, McGraw-Hill, Inc., 1967, pp. 516-517.

*Primary Examiner*—Craig E. Church

[57] ABSTRACT

An X-ray measurement device (20) is disclosed which utilizes a pair of detector units (29, 30) which receive X-rays through filters (40, 41) of differing attenuation of X-rays. The detector units preferably include two pairs of photodiode detectors arranged symmetrically in four quadrants with the diodes in each detector unit in diagonally opposite quadrants, thereby minimizing the effects of changes in orientation of the device with respect to the axis of the X-ray beam. The outputs of the detector units are passed to variable gain amplifiers (42, 43) the gains of which are automatically adjusted to bring the output voltages within a desired range, and the outputs of the amplifiers are integrated by integrators (49, 50). After a selected period of time, the integration is stopped and the output voltages of the integrators (49, 50) are held and passed to an analog-to-digital converter (57) which determines the ratio of the output signals from the integrators and provides a multi-bit output signal on a bus (58) to the address lines (59) of a preprogrammed memory (60). The data location addressed by the output signal from the converter may contain data which corresponds to the kVp value of an X-ray machine at the calculated ratio, and the output data from the memory is provided to a display unit (63) to provide a visual display in decimal form of the measured kVp value.

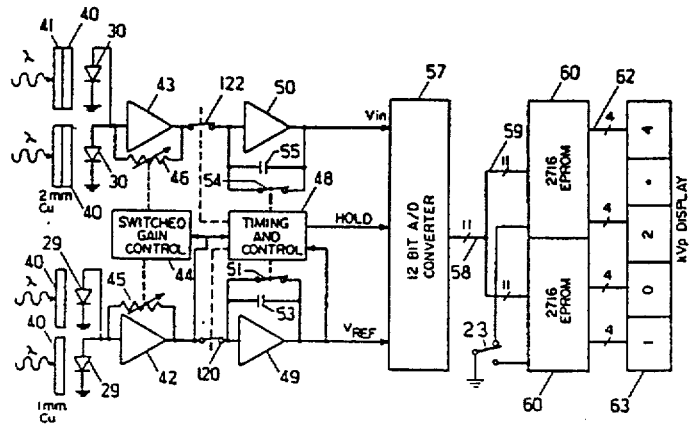

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-10, 12, 14-17, 19-26 is confirmed.

Claims 11, 13, 18 are cancelled.

New claims 27-30 are added and determined to be patentable.

27. *Apparatus for the measurement of the kVp level of an X-ray machine by measurement of the characteristics of the X-ray beam comprising:*
   (a) *first detector unit means for providing an electrical output signal related to the intensity of X-ray radiation incident on it which pass through an X-ray filter of a first attenuation characteristic;*
   (b) *second detector unit means, adjacent to the first detector unit means, for providing an electrical output signal related to the intensity of the X-ray radiation incident on it which pass through an X-ray filter of a second attenuation characteristic different than that of the X-ray filter for the first detector unit means;*
   (c) *first variable gain amplifier means for providing an amplified output signal at a gain level controlled in response to a control signal, the first variable gain amplifier means comprising a current to voltage amplifier with the first detector unit means connected to the input of the amplifier to provide current to voltage amplification of the signal from the detector unit means and wherein the first variable gain amplifier means responds to a control signal to change the feedback resistance around the amplifier to change the gain of the amplifier;*
   (d) *second variable amplifier means for providing an amplified output signal at a gain level controlled in response to a control signal, the second variable amplifier means comprising a current to voltage amplifier with the detector unit means connected to the input of the amplifier to provide current to voltage amplification of the signal from the detector unit means and wherein the second variable amplifier means responds to a control signal to change the feedback resistance around the amplifier to change the gain of the amplifier;*
   (e) *gain control means, responsive to the output signal of the first amplifier means, for providing control signals to the first and second amplifier means to adjust the gain thereof simultaneously until the magnitude of the output from the first amplifier means resulting from an X-ray exposure on the first detector unit means is below a selected maximum level, and thereafter maintaining the gain level during the X-ray exposure; and*
   (f) *means responsive to the outputs of the first and second amplifier means for generating an indication of the kVp voltage applied to the X-ray machine from which the X-rays were received by the first and second detector unit means.*

28. *The apparatus of claim 27 wherein the first and second amplifier means each includes a plurality of feedback resistors of different resistive values connected in parallel with one other between the input and output of the current to voltage amplifier and control signal responsive gates connected in series with at least all but one of the feedback resistors, and wherein the gain control means provides a control signal simultaneously to the gates in both the first and second amplifier means in a sequence to bring progressively lower resistors into the feedback loop around the current to voltage amplifiers until the magnitude of the output from the first amplifier means is below a selected maximum.*

29. *The apparatus of claim 27 wherein the X-ray filters are formed of the same material and wherein the X-ray filter for the second detector unit means is substantially thicker than the X-ray filter for the first detector unit means.*

30. *Apparatus for the measurement of the kVp level of an X-ray machine by measurement of the characteristics of the X-ray beam comprising:*
   (a) *first detector unit means for providing an output signal related to the intensity of the X-ray radiation incident on it which passes through an X-ray filter of a first attenuation characteristic;*
   (b) *second detector unit means, adjacent to the first detector unit means, for providing an output signal related to the intensity of the X-ray radiation incident on it which passes through an X-ray filter of a second attenuation characteristic different than that of the X-ray filter for the first detector unit means;*
   (c) *first variable gain amplifier means, connected to receive a signal from the first detector unit means, for providing an amplified output signal at a gain level controlled in response to a control signal;*
   (d) *second variable gain amplifier means, connected to receive a signal from the second detector unit means, for providing an amplified output signal at a gain level controlled in response to a control signal;*
   (e) *gain control means, responsive to the output signal of the first amplifier means, for providing control signals to the first and second amplifier means to adjust the gain thereof simultaneously until the magnitude of the output from the first amplifier means is below a selected maximum level, and thereafter maintaining the gain level;*
   (f) *means responsive to the outputs of the first and second amplifier means for generating an indication of the kVp voltage applied to the X-ray machine from which the X-rays were received by the first and second detector unit means; and*
   (g) *timing and control means, responsive to the magnitude of the output signal from the first amplifier means, for initially blocking the transmission of the signal from the first and second amplifier means to the means responsive to the outputs of the first and second amplifier means, for determining when the output signal from the first amplifier means exceeds a predetermined threshold level, thereafter delaying for a selected period of time to allow adjustment of the gain of the first and second amplifier means and, after the selected period of time has elapsed, transmitting the output signals from the first and second amplifier means to the means responsive to the outputs of the first and second amplifier means to allow it to generate an indication of the kVp voltage applied to the machine from which the X-rays were received by the first and second detector unit means.*

* * * * *